(12) United States Patent
Lee et al.

(10) Patent No.: US 10,436,631 B2
(45) Date of Patent: Oct. 8, 2019

(54) ULTRA-LOW POWER FLEXIBLE PIEZOELECTRIC AUDIO RECOGNITION SENSOR FOR INTERNET OF THINGS

(71) Applicant: KOREA ADVANCED INSTITUTE OF SCIENCE AND TECHNOLOGY, Daejeon (KR)

(72) Inventors: Keon Jae Lee, Daejeon (KR); Jae Hyun Han, Daejeon (KR); Daniel Joe, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 126 days.

(21) Appl. No.: 15/513,090

(22) PCT Filed: Jun. 9, 2016

(86) PCT No.: PCT/KR2016/006104
§ 371 (c)(1),
(2) Date: Mar. 21, 2017

(87) PCT Pub. No.: WO2016/200165
PCT Pub. Date: Dec. 15, 2016

(65) Prior Publication Data
US 2017/0299426 A1  Oct. 19, 2017

(30) Foreign Application Priority Data
Jun. 9, 2015 (KR) .................. 10-2015-0081072

(51) Int. Cl.
*G01H 11/08* (2006.01)
*G10L 15/28* (2013.01)
(Continued)

(52) U.S. Cl.
CPC ............ *G01H 11/08* (2013.01); *G01H 3/08* (2013.01); *G10L 15/22* (2013.01); *G10L 15/28* (2013.01);
(Continued)

(58) Field of Classification Search
CPC .......... G01H 11/08; G01H 3/08; G10L 15/22; G10L 15/28; G10L 21/028; G10L 25/18; H04R 17/02; H04R 7/06
(Continued)

(56) References Cited

U.S. PATENT DOCUMENTS 9,479,884 B2 * 10/2016 Kim ................. H04R 17/025
10,141,007 B1 * 11/2018 Kim ...................... G01H 3/08
(Continued)

FOREIGN PATENT DOCUMENTS

JP     2004085419 A  *  3/2004
JP     2009-101166        5/2009
(Continued)

OTHER PUBLICATIONS

Translation KR-101200355-B1 (Year: 2012).*
(Continued)

*Primary Examiner* — Natalie Huls
*Assistant Examiner* — Monica S Young

(57) ABSTRACT

Disclosed is a piezoelectric voice recognition sensor, which includes a flexible thin film, a piezoelectric material layer laminated on the flexible thin film, and an electrode laminated on the piezoelectric material layer, wherein the electrode includes a plurality of frequency separation channels arranged in a row, and the plurality of frequency separation channels have different lengths from each other. The piezoelectric voice recognition sensor separates a voice, recognized using a plurality of frequency separation channels having a trapezoidal shape, through the plurality of channels
(Continued)

depending on frequencies, and simultaneously converts the separated voice signals from mechanical vibration signals into electric signals by means of the flexible piezoelectric element so that the converted electric signals are recognized.

11 Claims, 13 Drawing Sheets

(51) Int. Cl.
*G10L 15/22* (2006.01)
*G10L 21/028* (2013.01)
*H04R 17/02* (2006.01)
*G01H 3/08* (2006.01)
*G10L 25/18* (2013.01)
*H04R 7/06* (2006.01)

(52) U.S. Cl.
CPC ............ *G10L 21/028* (2013.01); *H04R 17/02* (2013.01); *G10L 25/18* (2013.01); *H04R 7/06* (2013.01)

(58) Field of Classification Search
USPC .......................................................... 73/645
See application file for complete search history.

(56) References Cited

U.S. PATENT DOCUMENTS

| | | | |
|---|---|---|---|
| 2004/0075363 | A1 | 4/2004 | Malkin et al. |
| 2015/0185764 | A1* | 7/2015 | Magi ....................... G06F 1/163 |
| | | | 361/679.03 |
| 2018/0084341 | A1* | 3/2018 | Cordourier Maruri .. H04R 3/00 |
| 2018/0324530 | A1* | 11/2018 | Hoskins ................... H04R 1/46 |

FOREIGN PATENT DOCUMENTS

| | | | |
|---|---|---|---|
| KR | 10-2012-0099036 | 9/2012 | |
| KR | 10-1200355 | 11/2012 | |
| KR | 101200355 B1 * | 11/2012 | ........... A61N 1/0541 |

OTHER PUBLICATIONS

Translation JP-2004085419-A (Year: 2004).*
International Search Report dated Sep. 27, 2016 for PCT/KR2016/006104.
Park, Kwi-Il et al., "High-efficient, Flexible Piezoelectric PZT Thin Fil, Nanogenerator on Plastic Substrates", *Advanced Materials*, vol. 26, No. 16, pp. 2514-2520 & "Supporting Information" pp. 1-12, Apr. 23, 2014.
Lee, Hyun Soo et al., "Flexible Inorganic Piezoelectric Acoustic Nanosensors for Biomimetic Artificial Hair Cells", *Advanced Functional Materials*, vol. 24, No. 44, pp. 6914-6921, Nov. 26, 2014.

* cited by examiner

EXISTING VOICE RECOGNITION SYSTEM

DEPOSIT NICKEL (400)

TRANSFER TO PLASTIC SUBSTRATE

US 10,436,631 B2

ULTRA-LOW POWER FLEXIBLE PIEZOELECTRIC AUDIO RECOGNITION SENSOR FOR INTERNET OF THINGS

This application claims the priority of Korean Patent Application No. 10-2015-0081072, filed on Jun. 9, 2015 in the KIPO (Korean Intellectual Property Office), the disclosure of which is incorporated herein entirely by reference. Further, this application is the National Stage application of International Application No. PCT/KR2016/006104, filed Jun. 9, 2016, which designates the United States and was published in Korean. Each of these applications is hereby incorporated by reference in their entirety into the present application.

TECHNICAL FIELD

This disclosure relates to an ultra-low power flexible piezoelectric voice recognition sensor which is applied to Internet of Thing (IoT), and more particularly, to a flexible piezoelectric-based ultra-low power voice recognition sensor for separating voice depending on frequencies through a plurality of frequency separation channels by means of a flexible piezoelectric thin film and also converting the separated voice signal from a mechanical vibration signal into an electric signal, thereby simplifying a voice recognition circuit and thus reducing power consumption, in order to substitute for existing high power voice recognition sensors based on microphones, ADC and DSP circuits.

BACKGROUND ART

A voice recognition sensor means a sensor which extracts and recognizes linguistic information from acoustic information included in a human voice and makes a response thereto. In these days where easy and convenient natural user interfaces (UI) are available, voice conversation is regarded as the most natural and convenient way among information exchange mediums between human and machines in the future IoT era. However, in order to make voice conversation with a machine, the human voice should be converted into a format which the machine is able to process, and thus process is voice recognition.

Voice recognition, represented by Siri of Apple, is configured as a combination of a microphone, an ADC (Analog to Digital Converter) and a DSP (Digital Signal Processing), but since the voice recognition consumes much power if it is always in a standby state, a user manipulate this function by pressing a start button and an end button. This is one of difficult problems in implementing a true voice recognition-based IoT (Internet of Things). Also, if an ultra-low power constant-operating voice recognition system is developed, it is expected to open inexhaustible IoT applications.

A voice recognition system which is easily useable without any separate learning or training is a promising technology leading the future industries in the IoT era where the demand on development and construction of UI for innovative next-generation IT products is increasing. The voice recognition system allows a user to input data even though the user does not have a free hand or is moving, and also information can be processed rapidly or in real time since the data can be input faster than typing.

Recently, owing to the evolution of performance of smart phone terminals, the development of artificial intelligence and knowledge search techniques and the bulk data processing using a cloud-based voice recognition system, an answer desired by a user can be accurately and rapidly found using an intelligent agent, but in spite of such advantages and possibilities, the voice recognition technology still has the following limits.

First, in view of hardware, the existing voice recognition technique using a combination of a microphone, an ADC and a DSP consumes very large power, and thus the voice recognition is actually not in a standby state continuously without a separate charger. Further, it is very restrictive to apply the voice recognition to a mobile voice recognition sensor. In addition, a preliminary operation such as pressing a voice recognition start button is required, and its accuracy, reliability and speed are deteriorated. In other words, in order to apply the voice recognition to IoT-based smart phones, TV, vehicles and other wearable devices, high sensitivity is essential, and even in a sleep state, the standby state should be maintained consistently without large power consumption, so that user voice may be recognized just with ultra-low power.

Next, in acoustic and linguistic views, the existing voice recognition technique using a combination of a microphone, an ADC and a DSP is based on a complicated algorithm and thus has a limit in recognizing natural conversational tones.

However, the cochlea of human efficiently processes signals of a complicated language through a simple algorithm after separating frequencies. Even though such a cochlea principle is applied to various devices, this has not yet been utilized as an ultra-low power voice recognition sensor for IoT, except for the case where this is copied as an artificial cochlea.

A flexible piezoelectric thin film was applied as an artificial cochlea as disclosed by H. Lee et al. in the paper of Advanced Functional Materials, Vol. 24, No. 44, p. 6914, 2014. Here, three piezoelectric elements are attached to a thin trapezoidal silicon membrane to separate voice signals in an audible frequency band depending on frequencies. In this paper, three individual piezoelectric elements are attached onto a silicon membrane to separate frequencies and then applied to an artificial cochlea, but this has not considered an algorithm and a circuit design as an ultra-low power voice recognition sensor for IoT.

In addition, Korean unexamined patent publication No. 10-2012-0099036 (Sep. 6, 2012) proposes a piezoelectric device capable of outputting a haptic feedback effect using a plurality of resonant frequencies. Meanwhile, even though this document provides a haptic feedback technique based on tactual sense, force, kinesthetic sense or the like, there is no disclosure in relation to a method for recognizing voice signals after a recognized voice is separated into a plurality of frequencies.

(Paper) H. Lee et al., Advanced Functional Materials, 24(44), 6914, 2014

(Patent Literature 1) KR10-2012-0099036 A

DISCLOSURE OF THE INVENTION

Technical Problem

This disclosure is directed to providing an ultra-low power piezoelectric voice recognition sensor for IoT, which may reduce power consumption by means of simplification of a voice recognition circuit by separating a voice, recognized through a plurality of frequency separation channels having a trapezoidal shape and made of a single flexible piezoelectric thin film, through the plurality of channels depending on frequencies, and simultaneously converting the separated voice signals from mechanical vibration signals into electric signals by means of the flexible piezoelectric element and recognizing the converted electric signals.

In other words, the present disclosure is directed to providing a piezoelectric voice recognition sensor, which may greatly reduce power consumption by sensing and detecting acoustic signals, separated depending on frequencies before performing digital sampling and acoustic signal processing for a spectrum of a human voice, so that the voice recognition circuit is simplified in comparison to the existing high power voice recognition sensor having a microphone, ADC and DSP circuit.

In addition, the present disclosure provides a next-generation ultra-low power voice recognition sensor, which may substitute for the existing voice sensor configured with a combination of having a microphone, ADC and DSP using a flexible inorganic piezoelectric material.

Technical Solution

In one general aspect of the present disclosure, there is provided an ultra-low power flexible piezoelectric voice recognition sensor for Internet of Thing (IoT), comprising: a flexible thin film 600; a piezoelectric material layer 300 laminated on the flexible thin film 600; and an electrode 500 laminated on the piezoelectric material layer 300, wherein the electrode 500 includes a plurality of frequency separation channels arranged in a row, and wherein the plurality of frequency separation channels have different lengths from each other.

The plurality of frequency separation channels may be arranged so that unit channels thereof have gradually increasing or decreasing lengths.

The plurality of frequency separation channels may be arranged in a trapezoidal shape as a whole.

The piezoelectric voice recognition sensor may further include a passivation layer laminated to cover the electrode 500 entirely.

In another aspect of the present disclosure, there is provided a method for manufacturing an ultra-low power flexible piezoelectric voice recognition sensor for IoT, comprising: providing a sacrificial substrate 100; laminating a buffer layer 200 on the sacrificial substrate 100; depositing a PZT thin film 300, which is a piezoelectric material layer, onto the buffer layer 200; laminating a nickel metal layer 400 on the PZT thin film 300; separating the buffer layer 200 on the PZT thin film 300; and forming an electrode 500 having a plurality of frequency separation channels on the PZT thin film 300 so that the plurality of frequency separation channels are arranged in a row, wherein the separating step includes separating the buffer layer 200 on the PZT thin film 300 by means of a nickel separation process or a laser lift off (LLO) process, and wherein the plurality of frequency separation channels have different lengths from each other.

The method may further include depositing a passivation layer on the electrode 500, after forming the electrode 500.

The buffer layer 200 may be made of a silicon oxide.

The present disclosure also provides a mobile subminiature voice sensor system to which voice recognition-based IoT is applied, comprising the piezoelectric voice recognition sensor.

The present disclosure also provides a ubiquitous device, comprising the mobile subminiature voice sensor system.

The present disclosure also provides a wearable electronic device, comprising the mobile subminiature voice sensor system.

Advantageous Effects

The ultra-low power flexible piezoelectric voice recognition sensor for IoT according to the present disclosure separates a voice, recognized using a plurality of frequency separation channels having a trapezoidal shape, through the plurality of channels depending on frequencies, and simultaneously converts the separated voice signals from mechanical vibration signals into electric signals by means of the flexible piezoelectric element so that the converted electric signals are recognized.

In the present disclosure, a flexible piezoelectric voice recognition sensor capable of separating frequencies and a sensor module compatible thereto are fabricated by adopting a sound transfer mechanism of a cochlea of the human body, thereby implementing an ultra-low power voice UI for implementing continuously-operating IoT.

In addition, since voice recognition is performed by separating frequencies of a sound wave with ultra-low power by using a flexible piezoelectric material without any combination of a microphone, a ADC and a DSP, a language and a speaker can be identified by a machine in a standby state where power consumption is reduced to the minimum, and it is possible to implement an embedded voice recognition sensor and module allowing bidirectional communication and response.

The present disclosure allows more rapid and accurate voice signal processing and high-sensitive recognition by means of voice spectrum separation and digital sampling depending on frequencies, and costs may be reduced since a sound analyzing module is simplified. By doing so, it is possible to identify a speaker in spite of variability such as surrounding noise.

In addition, in the present disclosure, voice recognition is available in a standby state even in a sleep state since power is substantially not consumed.

In the present disclosure, a speaker and basic commands may be recognized easily and conveniently without any preliminary operation such as pressing a voice recognition start button or a voice recognition end button.

MODE FOR CARRYING OUT THE INVENTION

Figure 1:
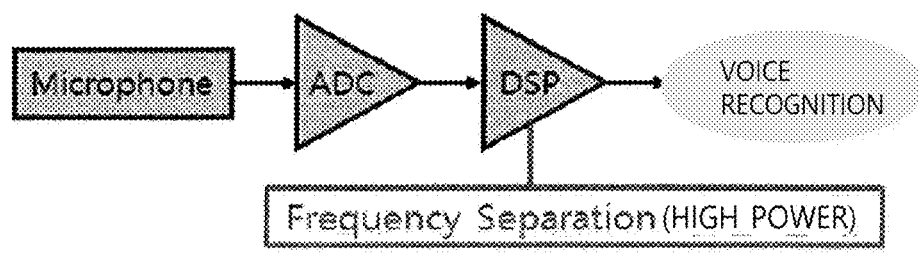
FIG. 1 is a diagram comparatively showing differences between the existing voice recognition system and the present disclosure.
Figure 1:
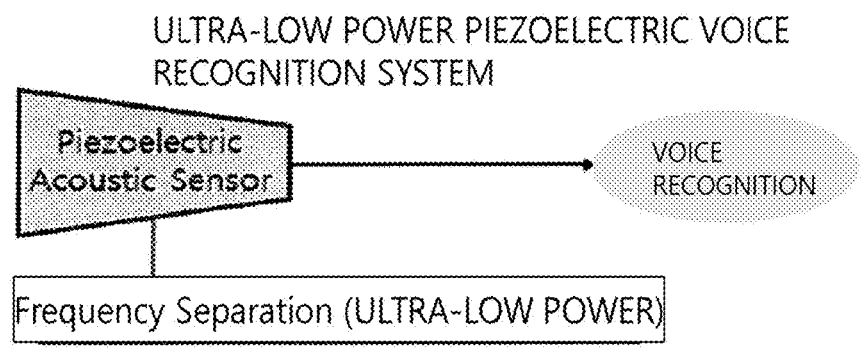

Hereinafter, embodiments of the present disclosure will be described in detail with reference to the accompanying drawings. The present disclosure may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art. In the drawings, like reference numerals denote like elements.

FIG. 1 is a diagram comparatively showing differences between the existing voice recognition system and the present disclosure. In FIG. 1, the existing voice recognition system receives a micro voice signal in an analog form, converts the micro voice signal into a digital signal by means of an analog-to-digital converter (ADC), and then processes the digital signal by means of digital signal processing (DSP) to separate frequencies, but at this time, high power is consumed.

Meanwhile, an ultra-low power voice recognition sensor according to the present disclosure performs voice recognition instantly by using a piezoelectric sensor, which allows ultra-low power operation. The existing frequency separation processes using a microphone, ADC and DSP are integrated into a single process using a piezoelectric voice recognition sensor. Namely, voice signals are separated depending on frequencies at a plurality of electrode channels, and simultaneously mechanical motions are converted into electric signals at a thin film made of a piezoelectric element so that electric signals are detected at each frequency band.

In other words, in case of the existing microphone, high power is consumed since a frequency band filter, ADC and DSP are used, but in the present disclosure, a plurality of piezoelectric elements are used to generate current separately for frequencies, and thus the power consumed by the band filter, the ADC and the DSP may be reduced. In addition, the power consumed for extracting frequencies may also be reduced.

FIGS. 2 to 10 are cross-sectional views for illustrating a method for manufacturing a piezoelectric voice recognition sensor according to an embodiment of the present disclosure.

Figure 2:
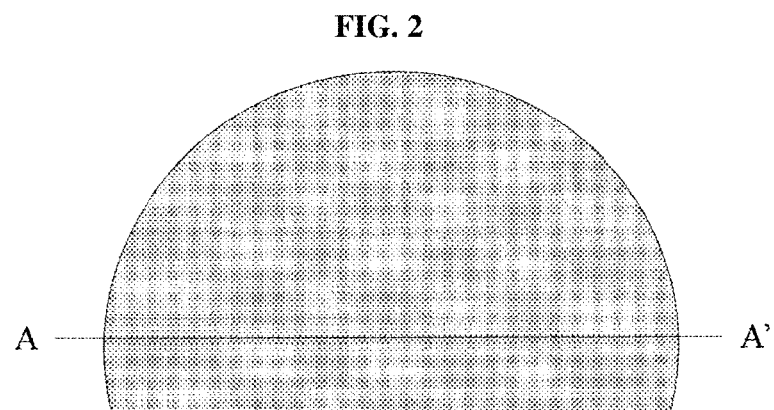
FIGS. 2 to 10 are cross-sectional views for illustrating a method for manufacturing a piezoelectric voice recognition sensor according to an embodiment of the present disclosure.
Figure 2:
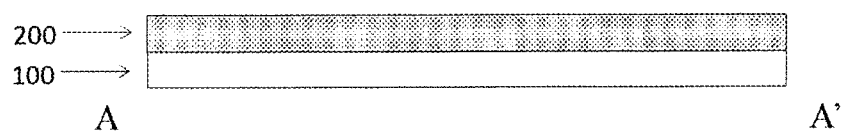

Referring to FIG. 2, a silicon substrate 100 serving as a sacrificial substrate is depicted. In the present disclosure, the sacrificial substrate 100 gives stress deviation with a metal layer which is laminated later, but is not directly adhered to a nano-generator element. In an embodiment of the present disclosure, compressive stress of the silicon substrate 100 makes a mismatch with tensile stress of the metal layer adhered to an upper portion thereof, and a separate buffer layer (a silicon oxide layer in an embodiment of the present disclosure) adhered onto the silicon substrate 100 is cracked due to an external energy applied later. Here, the horizontal crack of the buffer layer will be described later in more detail. In the present disclosure, particularly, the cracked region may be adjusted or controlled according to the difference in stress between the metal layer and the sacrificial substrate.

The buffer layer 200 such as a silicon oxide layer is laminated on the silicon substrate 100. In the present disclosure, the buffer layer 200 may be separated by a physical force generated due to the difference in stress, and is adhered to a nano-generator element. In an embodiment of the present disclosure, a silicon oxide layer is used as the buffer layer 200, and the adhesion force between the silicon oxide layer and the nano-generator is set so that the nano-generator element may be effectively separated due to the difference in stress between the lower substrate and the metal layer.

Meanwhile, the silicon substrate 100 and the buffer layer 200 may be used as a glass substrate or a sapphire substrate as one integrated substrate.

Figure 3:
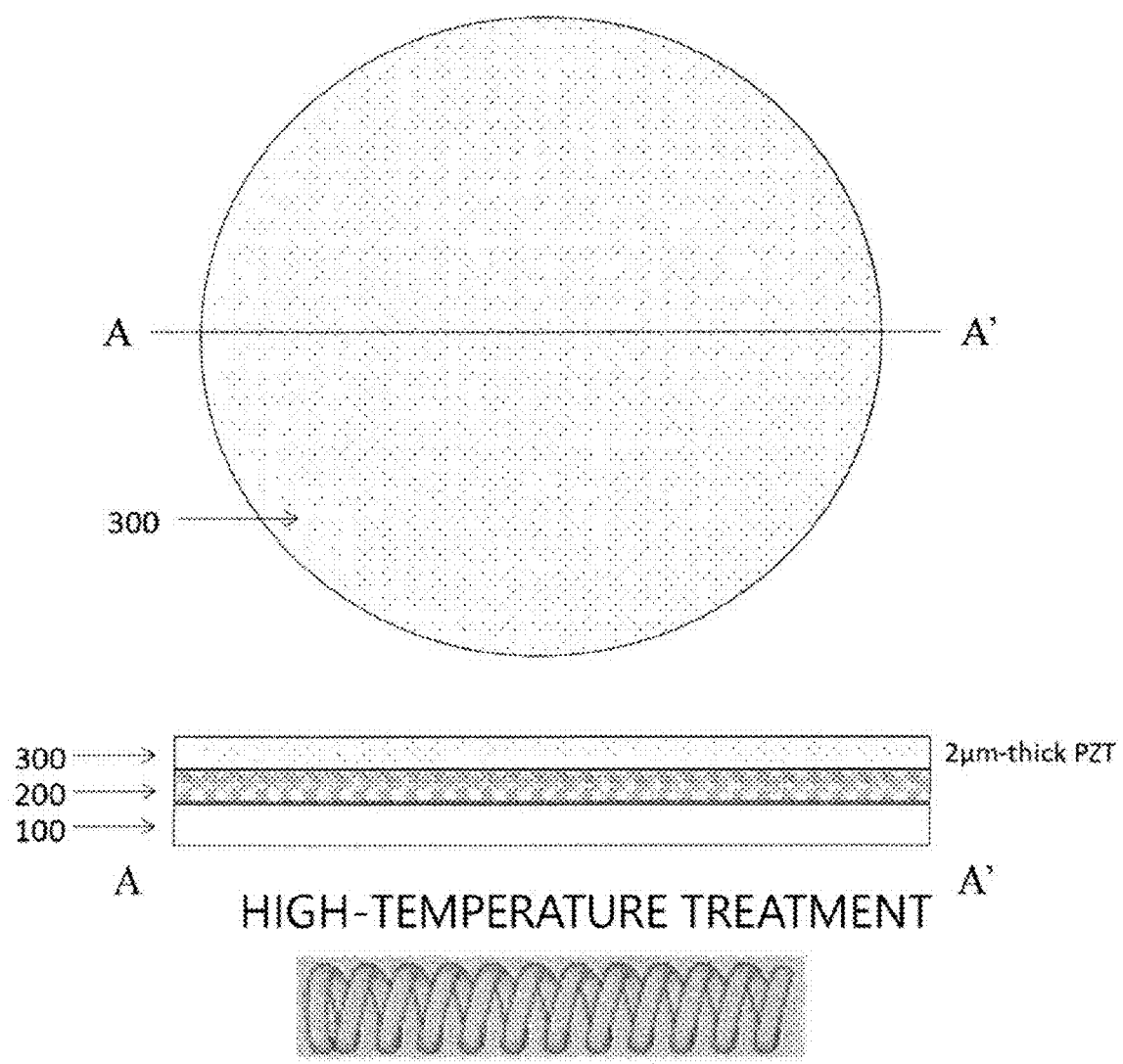

Referring to FIG. 3, a PZT thin film 300 which is a piezoelectric material layer is deposited on the buffer layer 200 by means of a sol-gel process well known in the art. In order to remove organic components from the sol-gel solution thin film, a 0.4M PZT sol-gel solution (Zr:Ti at a mole ratio of 52:48 having more than 10 mol % of PbO) is spin-coat on a wafer at 2500 rpm for 10 minutes under an air atmosphere of 450° C. along with a pyrolysis process.

The deposition and pyrolysis processes are repeated several times in order to form a PZT thin film with a thickness of 2 μm. The PZT thin film is crystallized in the art at 650° C. for 45 minutes. For the pyrolysis and crystallization processes, rapid thermal annealing (RTA) is used.

Figure 4:
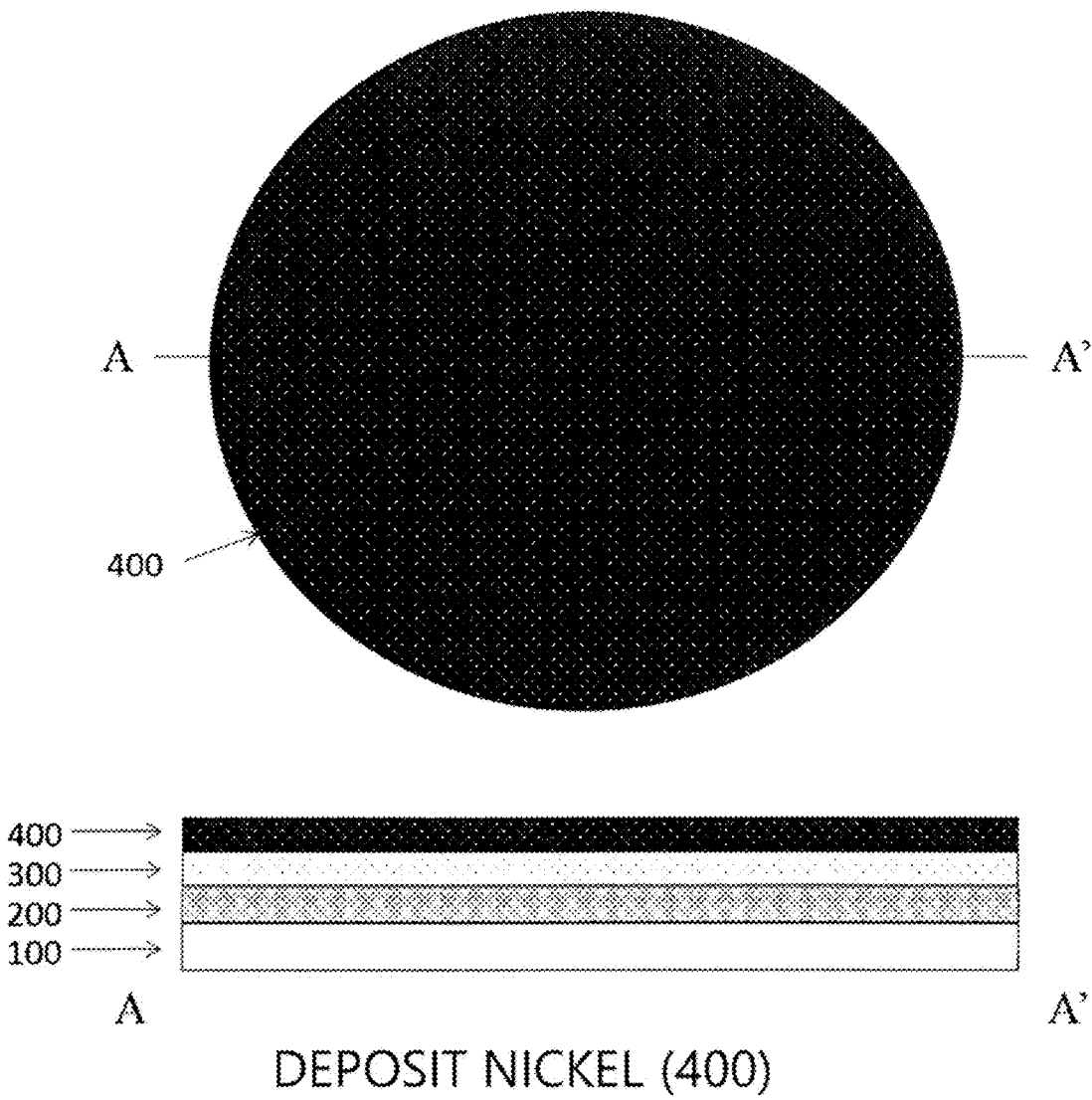

Referring to FIG. 4, a nickel layer 400 serving as a metal layer is laminated on the PZT thin film 300. In an embodiment of the present disclosure, the nickel layer 400 may be laminated by means of common semiconductor processes such as sputtering and PVD, and a common metal coating method may also be used for laminating the nickel layer 400. By means of the lamination, the nickel layer 400 adhered onto the PZT thin film 300 is formed.

Figure 5:
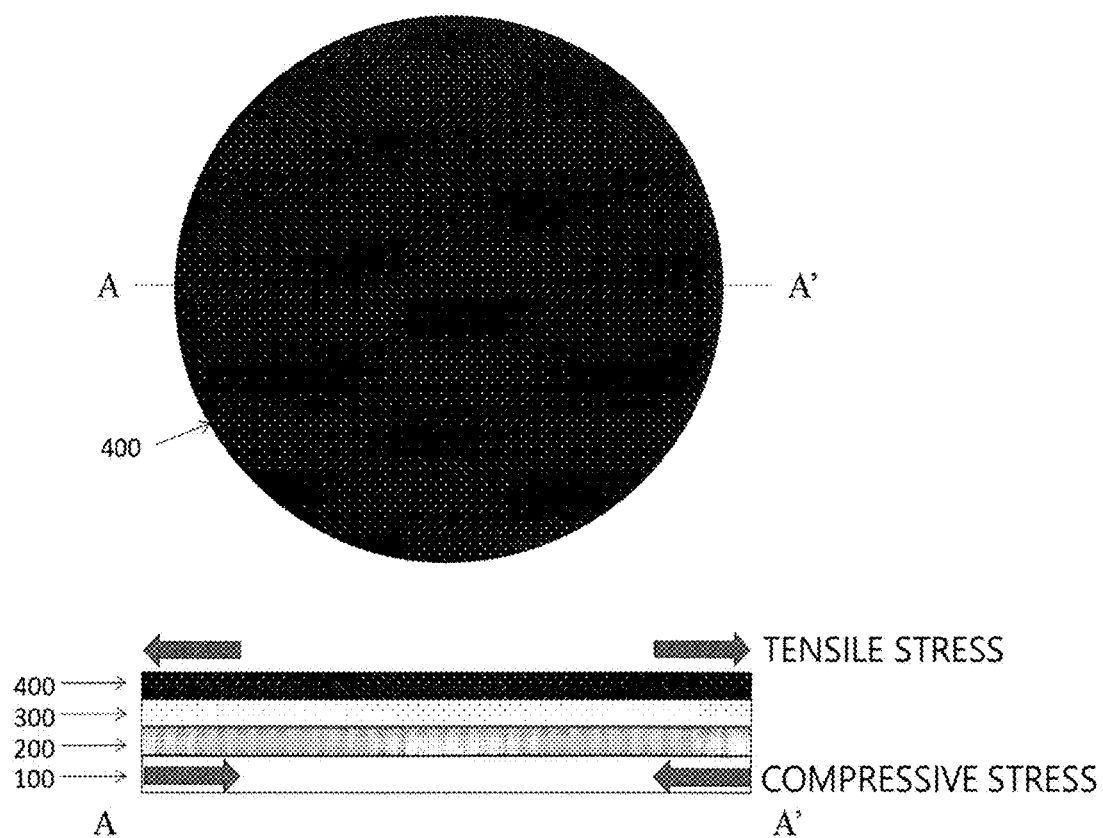

Referring to FIG. 5, a mechanical energy (for example, a physical impact) or a thermal energy is applied to the nickel layer 400 serving as a metal layer having a residual tensile stress. As a result, residual tensile stress is generated at nickel, and a mismatch or asymmetry is generated between the residual tensile stress and the residual compressive stress of the silicon substrate indirectly adhered to the nano-generator element through the buffer layer. Accordingly, at a border surface between the buffer layers 200 made of a silicon oxide and the PZT thin film 300, the adhesion of these layers are released. In the present disclosure, a desired element is laminated on the substrate by using a metal layer having a tensile stress different from the residual compressive stress of the silicon substrate as described above, and then energy is applied from the outside to separate the element at a weak adhesion surface. In particular, since the separation surface where the element is separated is set at the border surface of the buffer layer which is adhered to the PZT thin film 300 with the weakest force, the element fabricated on the silicon substrate may be separated and transferred while maintaining its original shape. In addition, the location where the element is separated may be controlled according to the difference in stress between the metal layer and the sacrificial substrate.

Figure 6:
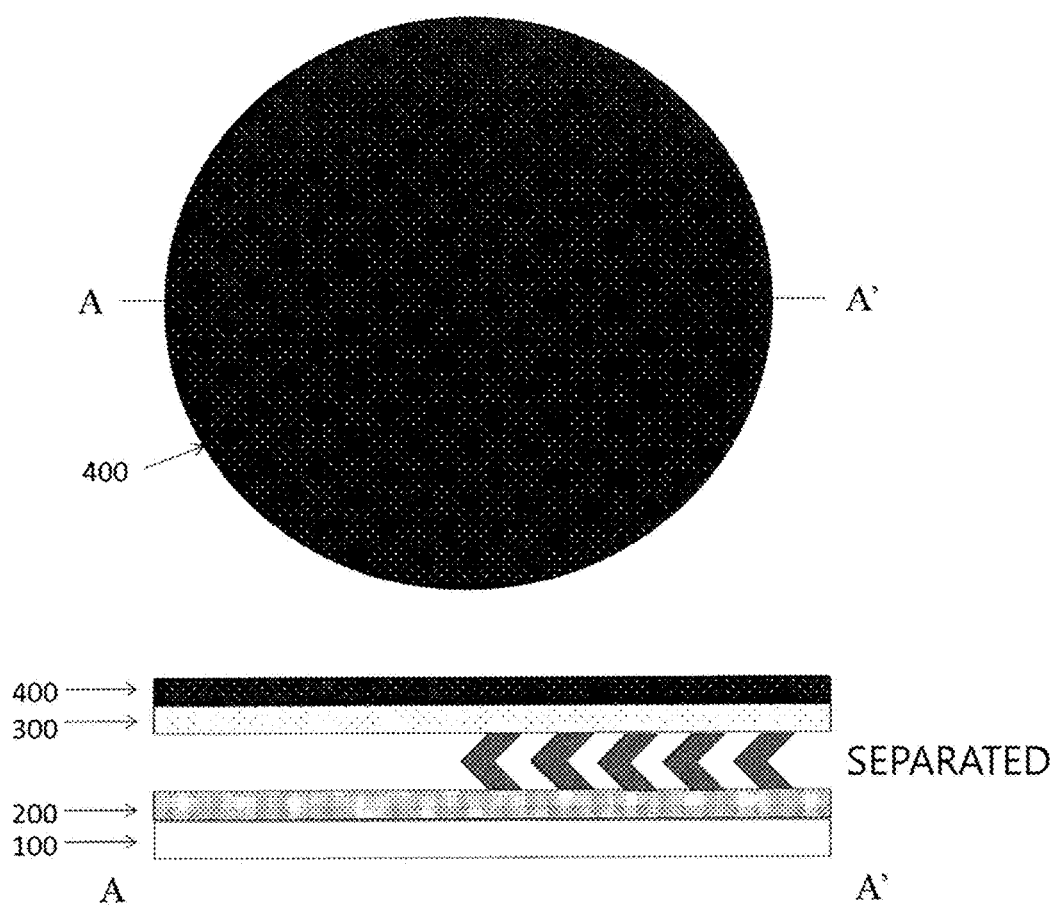
Figure 7:
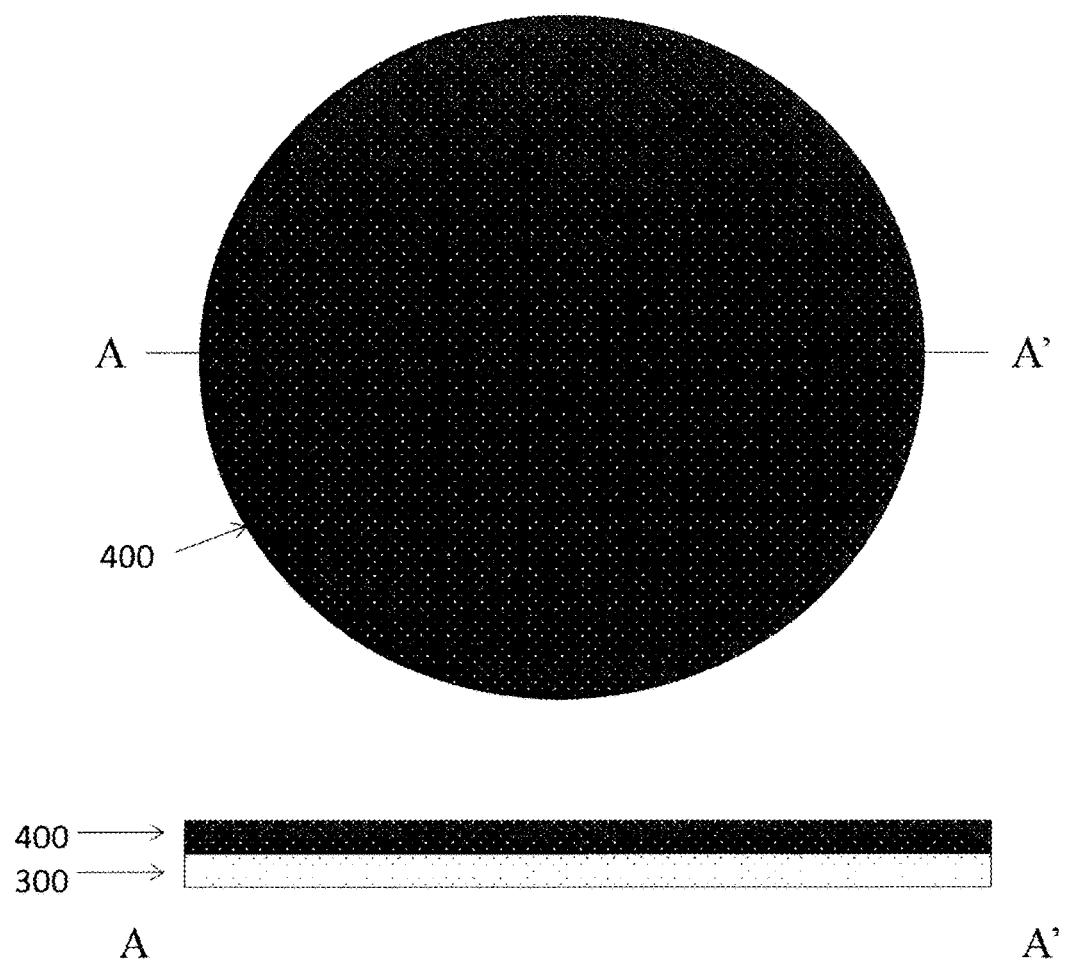

Referring to FIG. 6, the PZT thin film 300 whose adhesion is released due to the mismatch of the residual tensile stress of the metal layer contacting the silicon substrate is separated from the silicon oxide buffer layer 200 (see FIG. 7).

Meanwhile, the PZT thin film 300 may also be separated from the silicon oxide buffer layer 200 by means of a laser lift off (LLO) process. In other words, in order to separate the PZT thin film 300 from the buffer layer 200, XeCl-pulse excimer laser is irradiated to the rear surface of the silicon oxide buffer layer 200, and for example, the XeCl laser has a photon energy (4.03 eV) smaller than the band-gap energy of the buffer layer 200 and greater than that of the PZT thin film 300. For this reason, the PZT thin film may be moved to a flexible plastic substrate. As a result, the laser beam passes through the silicon oxide buffer layer, followed by local melting and dissociation of the PZT at the border to the buffer layer.

As described above, a laser lift off (LLO) process for converting the PZT thin film into a plastic substrate is performed.

Figure 8:
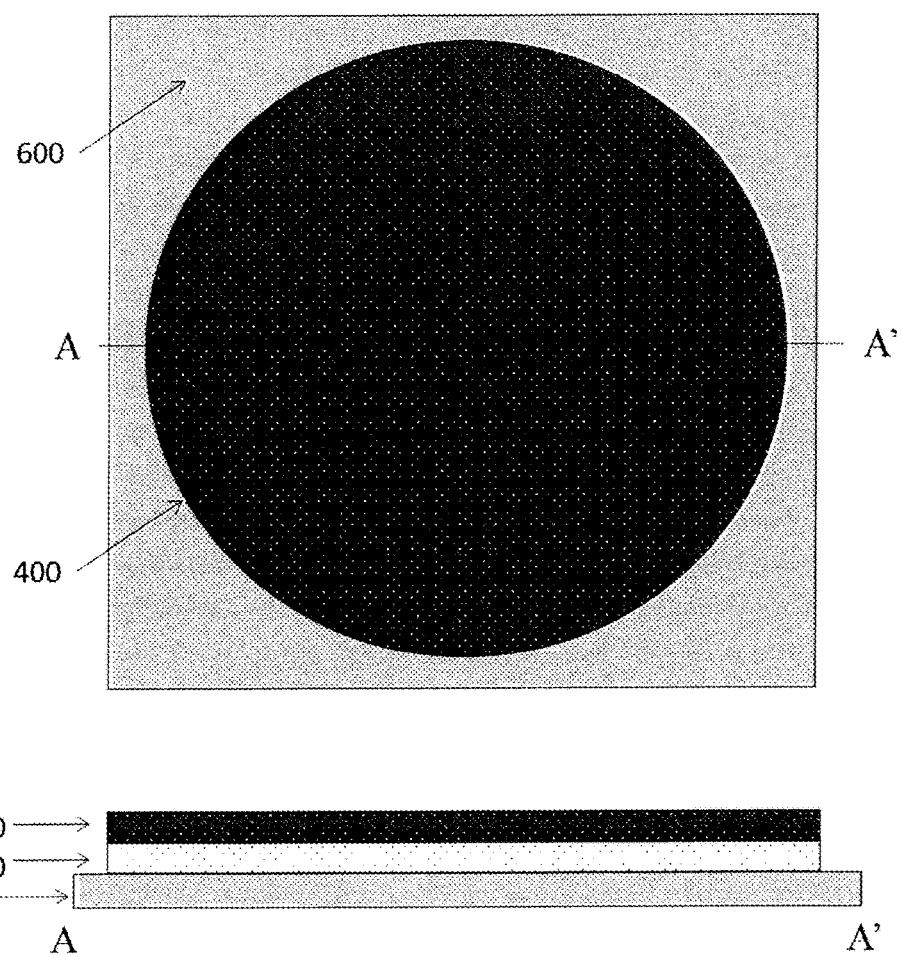

Referring to FIG. 8, the PZT thin film 300 and the nickel layer 400 separated from each other are physically moved to a flexible plastic substrate 600 and adhered thereto. By doing so, the flexible nano-generator transferred onto the flexible plastic substrate 600 is completely made.

Figure 9:
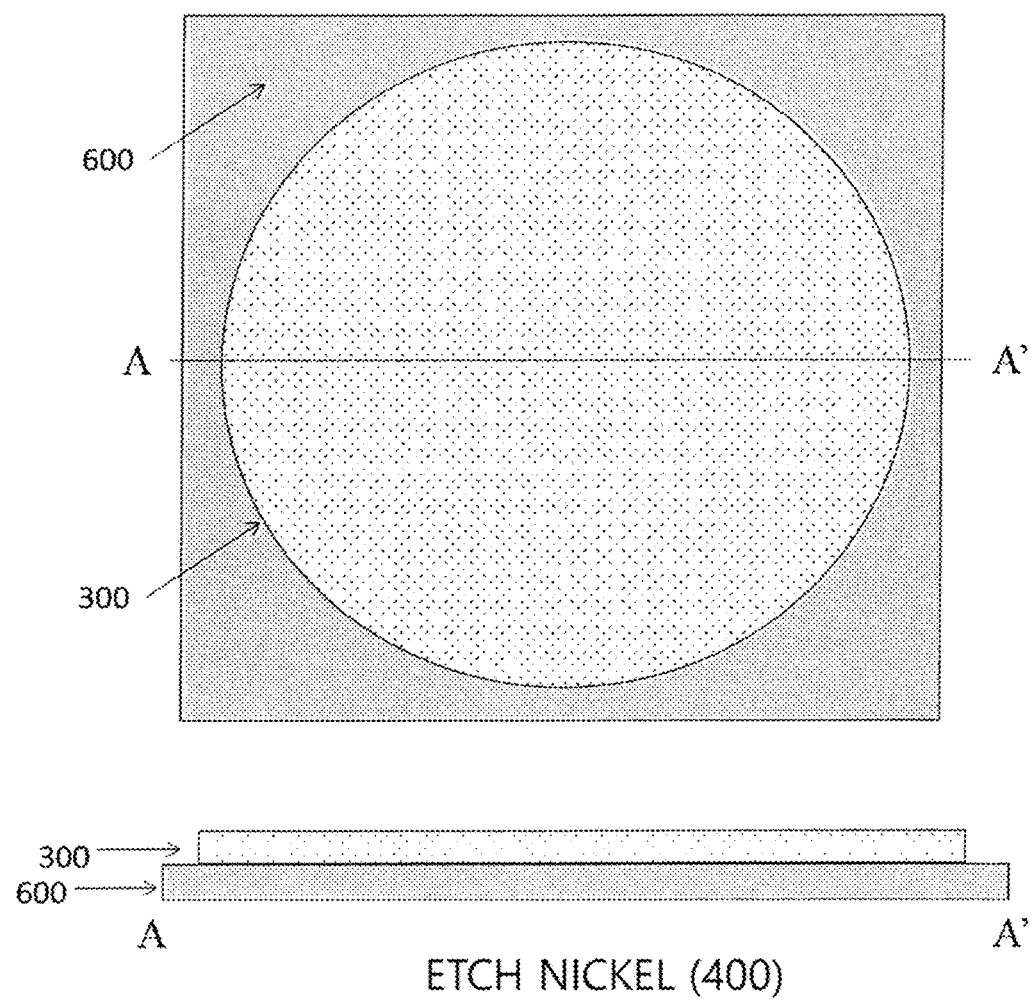

Referring to FIG. 9, the nickel layer 400 is removed by means of common chemical etching. For example, an upper portion of an element adhered to the plastic substrate 600 is immersed in a specific etching solution for etching the nickel layer 400 to remove the nickel layer 400. However, the nickel layer 400 may be selectively removed using various common metal layer removing methods, which also falls within the scope of the present disclosure.

Figure 10:
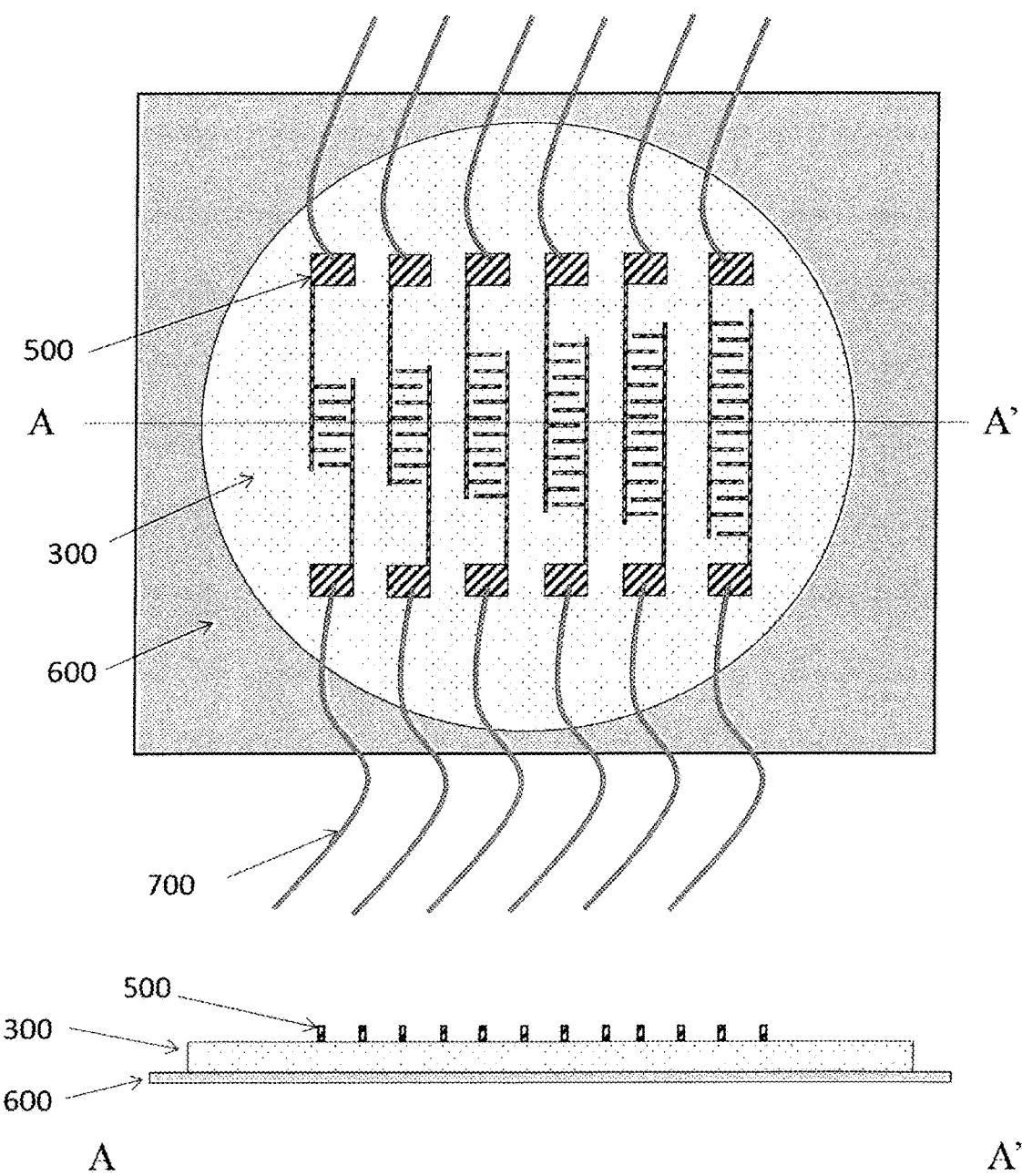

Next, referring to FIG. 10, the electrode 500 is laminated on the PZT thin film 300, and by doing so, the components are laminated in the order of the plastic substrate 600 serving as a flexible thin film, the PZT thin film 300 and the electrode 500. Here, the electrode 500 forms a plurality of frequency separation channels.

Figure 11:
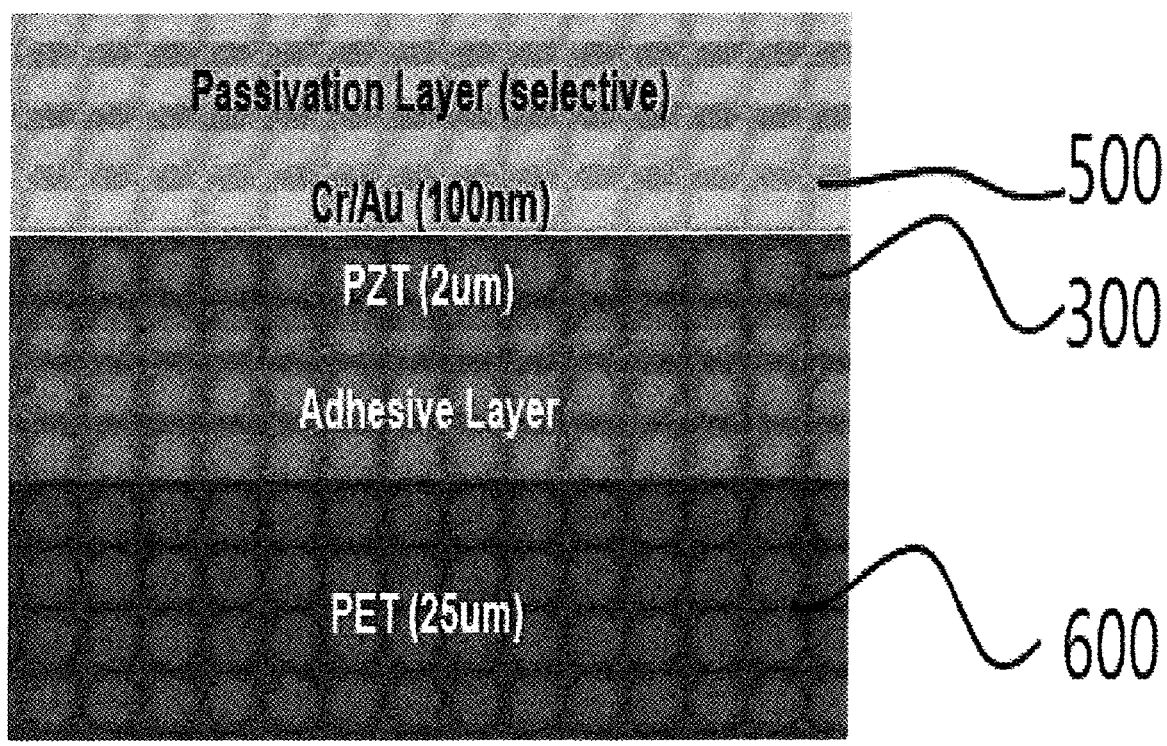
FIG. 11 is a diagram showing a piezoelectric voice recognition sensor according to an embodiment of the present disclosure.

Meanwhile, referring to FIG. 11, the piezoelectric voice recognition sensor of the present disclosure may selectively include a passivation layer to cover the electrode 500 entirely.

Figure 12:
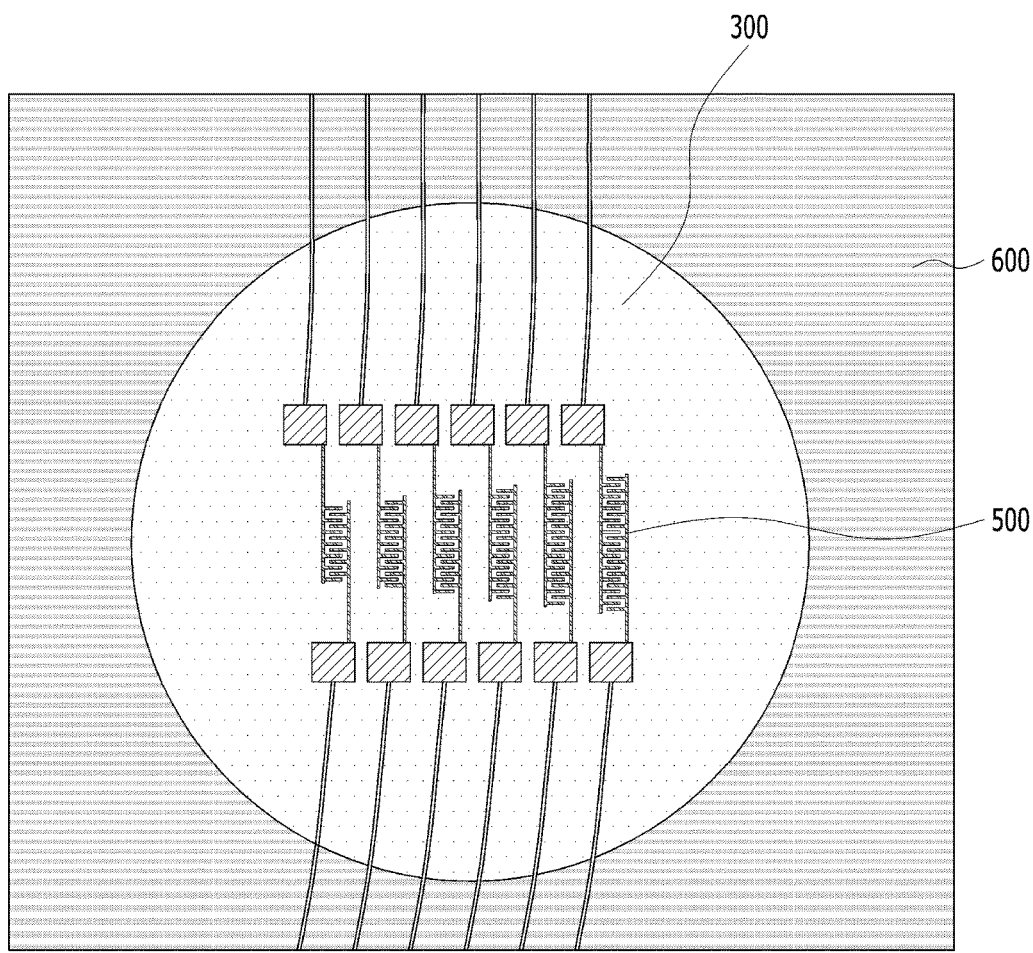
FIG. 12 is a photograph showing an actual product of the piezoelectric voice recognition sensor according to an embodiment of the present disclosure.
Figure 13:
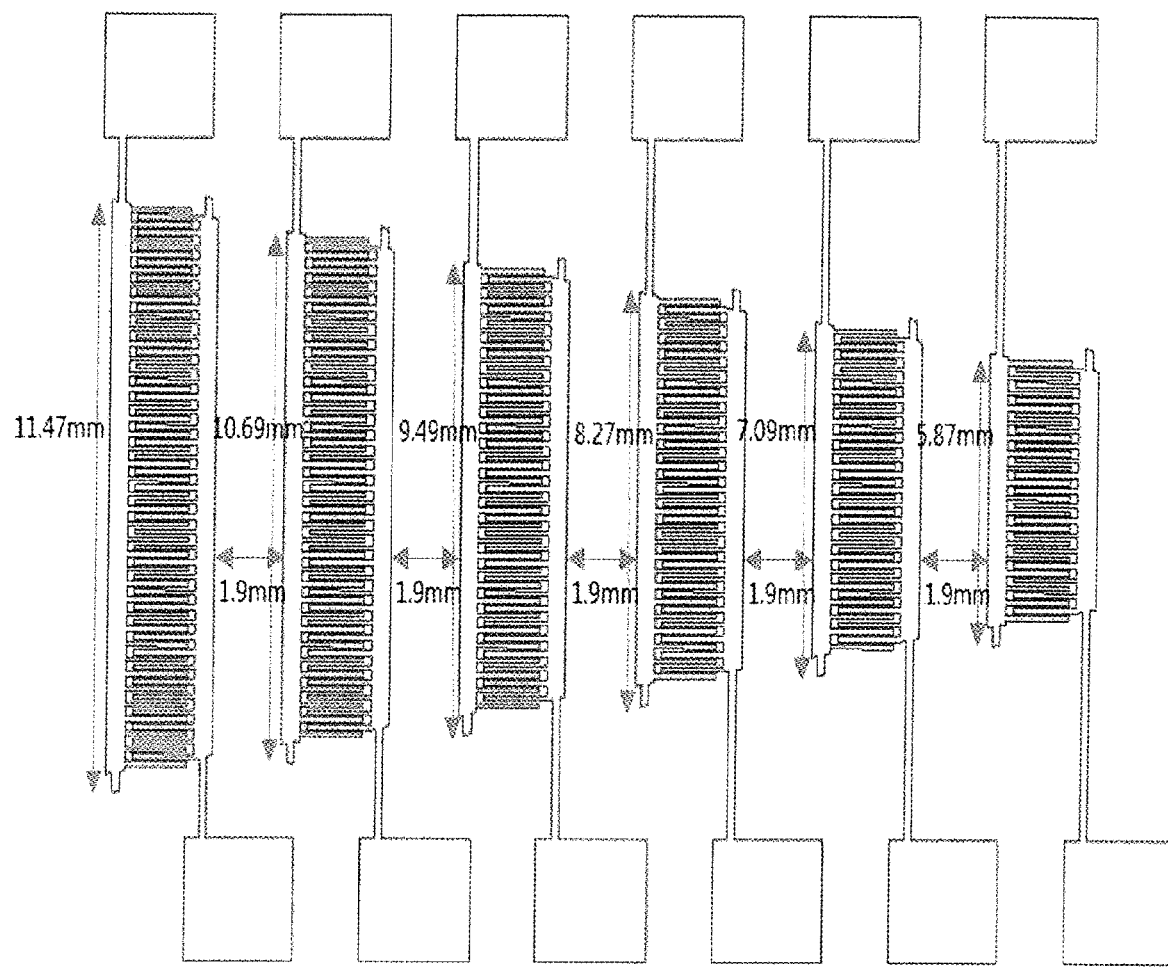
FIG. 13 is a diagram showing a plurality of electrode channels, employed at the piezoelectric voice recognition sensor.

FIG. 12 is a photograph showing an actual product of the piezoelectric voice recognition sensor according to an embodiment of the present disclosure, and FIG. 13 is a diagram showing a plurality of electrode channels, employed at the piezoelectric voice recognition sensor.

Referring to FIG. 12, the PZT thin film 300 having a circular shape and a PU adhesive for adhering the plastic substrate 600 and the PZT thin film 300 are located on the transparent plastic substrate 600 having a rectangular shape, and the electric energy generated from the PZT thin film 300 is collected by using the Cr/Au electrode 500 at the top of the PZT thin film 300. In addition, a passivation layer for protecting these components is additionally deposited to play a protection role.

Meanwhile, the plastic substrate 600, the UV-sensitive PU adhesive, the PZT thin film 300 and the passivation layer may be made of transparent material. The Cr/Au electrode 500 is configured so that Au is placed on Cr, and thus the electrode may be observed in a gold color by naked eyes.

Referring to FIG. 13, the overall configuration of the Cr/Au electrode 500 may have a trapezoidal artificial cochlea shape, and in detail, the Cr/Au electrode 500 may have six channels separated from each other at regular intervals. For example, a plurality of channels are formed through a process of physically cutting between the electrodes 500. In case of the separated six electrode channels, as the width of the artificial cochlea having a xylophone shape changes, a location where a high frequency sound and a low frequency sound make an echo is varied, and thus it is possible to physically separate a human voice. A sound sensed through the separated six electrode channels is amplified through an analog circuit depending on frequencies, filtered, then converted into a digital signal and processed.

In the present disclosure, in addition to the separation of frequencies, the measurement of electric signals may also be a distinctive feature, and here a frequency in a band of 0.9 to 2.7 Hz may have a meaning. In addition, if the number of channels is increased, frequencies may be separated in more detail.

Figure 14:
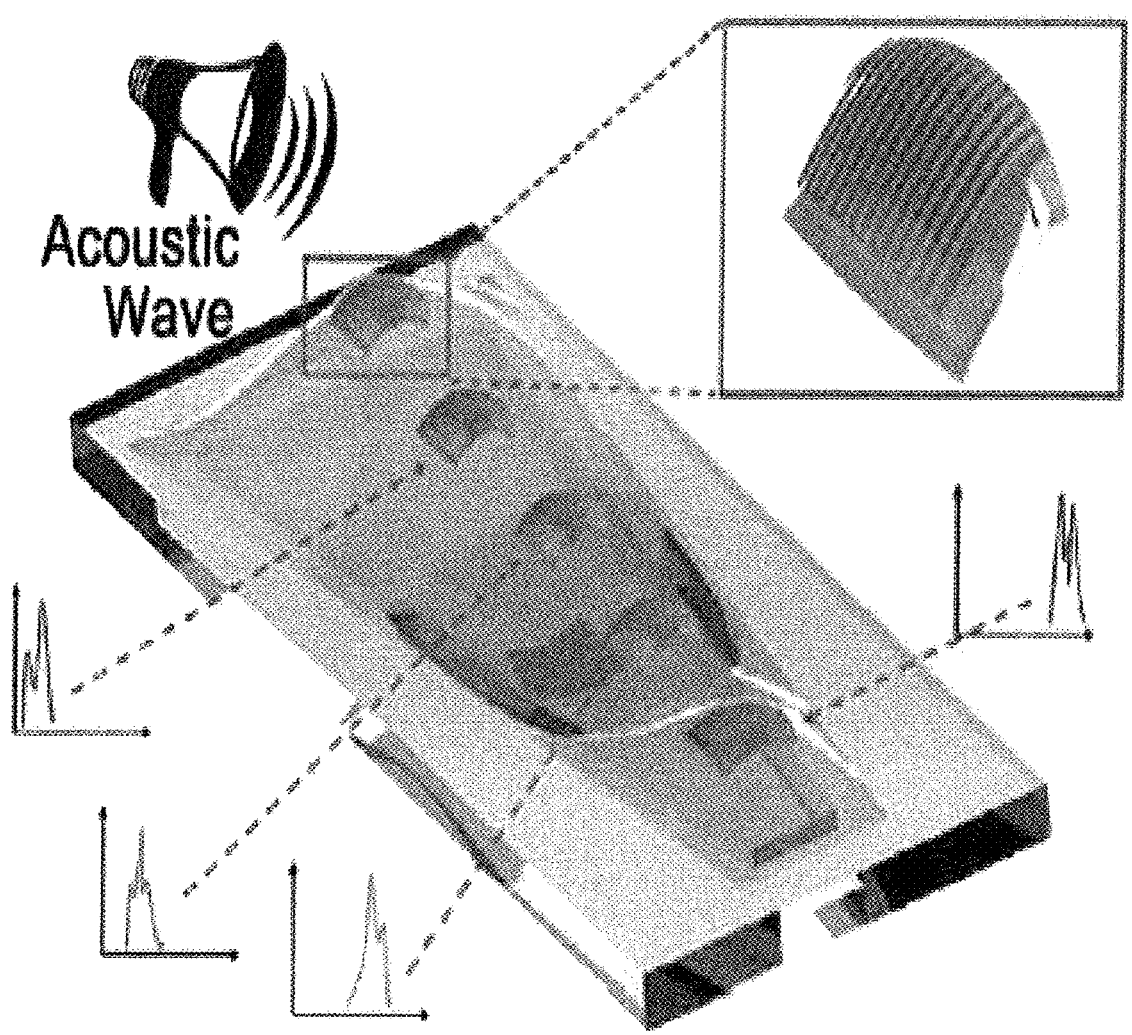
FIG. 14 is a diagram for illustrating a process of separating voice frequencies according to the present disclosure.

FIG. 14 is a diagram for illustrating a process of separating voice frequencies according to the present disclosure.

As shown in FIG. 14, the plurality of electrode channels arranged in a row corresponding to the sensed voice frequencies extract wavelength signals separated depending on frequencies.

The present disclosure is designed from the fact that voice recognition is implemented by copying a cochlea which is an auditory organ of a human, and power consumption may be greatly reduced by using a simple circuit based on a flexible piezoelectric voice sensor, instead of the existing combination of a microphone, ADC and DSP, in order to separate frequencies. In addition, if an efficient recognition algorithm compatible thereto is implemented, a natural language of a human may be recognized while ensuring high selectivity, sensitivity, sensing speed and stability.

The technique of the present disclosure may be applied to actual life. For example, while a user is driving a vehicle, a vehicle information system may be continuously in a standby state and be operated just with a voice of the user in a safe way. By doing so, TV, a cleaner, a washing machine, an air conditioner or the like may be remotely controlled just with a human voice by means of ultra-low power control. In particular, if a voice of the disabled or a patient is registered, facilities such as an elevator may be used more conveniently.

This technique is a fused technique encompassing the whole of IT-NT-BT-material technologies, which is inspired from the nature and enriches the human life. Since an identity, a psychological state, a health state, language ability or the like of a user may be figured out in a continuous standby state just through a voice of the user, personally customized service may be provided to the user. Also, this technique may be utilized in all sensor fields including security, finance, medical and education fields.

In particular, this technique may be applied to mobile healthcare by detecting and analyzing a voice pattern of a user, storing the voice pattern in a big data, then analyzing an emotional state and then feeding back the same to the user. In addition, since a security system may be reinforced by means of voice recognition and speaker identification, it is expected that the present disclosure would be helpful for protecting personal information and privacy.

The present disclosure may implement a subminiature voice sensor system for voice recognition-based IoT and mobile purposes by using the above features.

In the present disclosure, a voice recognition sensor made of a high-efficient inorganic piezoelectric material on a flexible substrate separates mechanical vibration energy of a voice into different locations depending on frequencies by using the piezoelectric before performing digital sampling and sound signal processing to the human voice spectrum, then converts the mechanical vibration energy into electric signals, and process the voice signals in parallel depending on frequencies.

In the present disclosure, the plurality of frequency separation channels configure a shape of an artificial cochlea similar to a xylophone shape, and a human voice is physically separated since a location where a high frequency sound and a low frequency sound make an echo is varied depending on the sizes of the plurality of frequency separation channels. Here, each separated sound is amplified through an analog circuit depending on frequencies, filtered, converted into a digital signal and then processed. This process consumes much less power in comparison to the existing method using a combination of a microphone, ADC and DSP.

The present disclosure provides a piezoelectric voice recognition sensor coupled onto a flexible thin film, which may also be used in a state of being attached to clothes or the like. In other words, the present disclosure may be applied as a technique for collecting a physical energy of a sound wave or ultrasonic wave, frequently generated in the surroundings, and converting into an electric energy, in a state of being attached to clothes.

Generally, in order to realize the ubiquitous network which 'exists anywhere', a ubiquitous power source which 'exists and operates anywhere' is indispensable. Meanwhile, the power source of the ubiquitous existing every here and there should be self-sufficing without requiring charging. In other words, power-generating ability and power-charging ability should be provided.

As described above, the piezoelectric voice recognition sensor according to the present disclosure separates a voice, sensed using a plurality of frequency separation channels having a trapezoidal shape, through the plurality of channels depending on frequencies, and simultaneously converts the separated voice signals from mechanical vibration signals into electric signals by means of the flexible piezoelectric element so that the converted electric signals are recognized.

Even though the embodiments of the present disclosure have been described and illustrated, the present disclosure is not limited to the specific embodiments but may be modified in various ways by those skilled in the art without departing from the scope of the present disclosure defined by the appended claims, and such modifications should not be interpreted separately from the technical feature and prospect of the present disclosure.

The invention claimed is:

1. An ultra-low power flexible piezoelectric voice recognition sensor for internet of things (IoT), comprising:
a flexible thin film;
a piezoelectric material layer laminated on the flexible thin film; and
an electrode laminated on the piezoelectric material layer,
wherein the electrode includes a plurality of frequency separation channels arranged in a row,
wherein the plurality of frequency separation channels have different lengths from each other,
wherein the plurality of frequency separation channels are separated from each other with a constant interval,
wherein lengths of the plurality of frequency separation channels are in a range from 5.87 mm through 11.47 mm,
wherein the lengths of the plurality of frequency separation channels increase incrementally in a range from 0.78 through 1.22 mm,
wherein a sound sensed through the plurality of frequency separation channels is amplified through an analog circuit depending on frequencies, filtered, and then converted into a digital signal and processed,
wherein electric signals sensed through the plurality of frequency separation channels correspond to a band of frequency from 0.9 through 2.7 kHz.

2. The ultra-low power flexible piezoelectric voice recognition sensor for IoT of claim 1, wherein the plurality of frequency separation channels are arranged so that unit channels thereof have gradually increasing or decreasing lengths.

3. The ultra-low power flexible piezoelectric voice recognition sensor for IoT of claim 2, wherein the piezoelectric voice recognition sensor further includes a passivation layer laminated to cover the electrode entirely.

4. A mobile voice sensor system to which voice recognition-based IoT is applied, the voice sensor system comprises the ultra-low power flexible piezoelectric voice recognition sensor for IoT of claim 1.

5. A wearable electronic device comprises the voice sensor system of claim 4.

6. A method for manufacturing an ultra-low power flexible piezoelectric voice recognition sensor for internet of things (IoT), comprising:
providing a sacrificial substrate;
laminating a buffer layer on the sacrificial substrate;
depositing a PZT thin film, which is a piezoelectric material layer, onto the buffer layer;
laminating a nickel metal layer on the PZT thin film;
separating the buffer layer on the PZT thin film;
removing the nickel metal layer by means of etching; and
forming an electrode having a plurality of frequency separation channels on the PZT thin film so that the plurality of frequency separation channels are arranged in a row,
wherein the separating step includes separating the buffer layer on the PZT thin film by means of a nickel separation process or a laser lift off (LLO) process,
wherein the plurality of frequency separation channels have different lengths from each other,
wherein the depositing step that deposits the PZT thin film onto the buffer layer comprises crystallizing the PZT thin film by pyrolysis,
wherein the plurality of frequency separation channels are separated from each other with a constant interval,
wherein lengths of the plurality of frequency separation channels are in a range from 5.87 mm through 11.47 mm,
wherein the lengths of the plurality of frequency separation channels increase incrementally in a range from 0.78 through 1.22 mm,
wherein a sound sensed through the plurality of frequency separation channels is amplified through an analog circuit depending on frequencies, filtered, and then converted into a digital signal and processed,
wherein electric signals sensed through the plurality of frequency separation channels correspond to a band of frequency from 0.9 through 2.7 kHz.

7. The method for manufacturing an ultra-low power flexible piezoelectric voice recognition sensor for IoT of claim 6, after forming the electrode, further comprising:
depositing a passivation layer on the electrode.

8. The method for manufacturing an ultra-low power flexible piezoelectric voice recognition sensor for IoT of claim 6, wherein the buffer layer is made of a silicon oxide.

9. An ultra-low power flexible piezoelectric voice recognition sensor for internet of things (IoT), comprising:
a flexible thin film;
a piezoelectric material layer laminated on the flexible thin film; and
an electrode laminated on the piezoelectric material layer,
wherein the electrode includes a plurality of frequency separation channels arranged in a row so that unit channels thereof have gradually increasing or decreasing lengths,
wherein the plurality of frequency separation channels are separated from each other with a constant interval,
wherein lengths of the plurality of frequency separation channels are in a range from 5.87 mm through 11.47 mm,
wherein the lengths of the plurality of frequency separation channels increase or decrease incrementally in a range from 0.78 through 1.22 mm,
wherein a sound sensed through the plurality of frequency separation channels is amplified through an analog circuit depending on frequencies, filtered, and then converted into a digital signal and processed, wherein electric signals sensed through the plurality of frequency separation channels correspond to a band of frequency from 0.9 through 2.7 kHz.

10. The ultra-low power flexible piezoelectric voice recognition sensor for IoT of claim 9, wherein the plurality of frequency separation channels are arranged in a trapezoidal shape as a whole.

11. The ultra-low power flexible piezoelectric voice recognition sensor for IoT of claim 9, wherein the piezoelectric voice recognition sensor further includes a passivation layer laminated to cover the electrode entirely.

* * * * *